United States Patent
Blum et al.

[11] Patent Number: 5,861,934
[45] Date of Patent: Jan. 19, 1999

[54] REFRACTIVE INDEX GRADIENT LENS

[75] Inventors: Ronald D. Blum, Roanoke, Va.; Amitava Gupta, Bethesda, Md.

[73] Assignee: Innotech, Inc., Roanoke, Va.

[21] Appl. No.: 643,656

[22] Filed: May 6, 1996

[51] Int. Cl.[6] .............................. G02C 7/06; B29D 11/00
[52] U.S. Cl. ........................ 351/169; 264/2.7; 351/159; 351/166; 351/172; 351/177; 359/653
[58] Field of Search .................... 359/652, 653, 359/654; 351/159, 168, 169, 170, 171, 172, 177; 264/2.7

[56] References Cited

U.S. PATENT DOCUMENTS

| | | | |
|---|---|---|---|
| 1,445,227 | 12/1923 | Meyrowitz | 351/172 |
| 1,509,636 | 9/1924 | Bugbee | 351/172 |
| 2,053,551 | 9/1936 | Culver et al. | 351/172 |
| 3,485,556 | 12/1969 | Naujokas | 351/169 |
| 3,486,808 | 12/1969 | Hamblen | 359/652 |
| 3,542,535 | 11/1970 | Hensler et al. | 65/30 |
| 3,563,057 | 2/1971 | Rosenbauer | 65/30 |
| 3,687,528 | 8/1972 | Maitenaz | 351/169 |
| 3,785,724 | 1/1974 | Cretin-Maitenaz | 351/169 |
| 3,877,798 | 4/1975 | Tolar et al. | 351/168 |
| 3,910,691 | 10/1975 | Maitenaz | 351/169 |
| 4,055,379 | 10/1977 | Winthrop | 351/169 |
| 4,056,311 | 11/1977 | Winthrop | 351/169 |
| 4,062,629 | 12/1977 | Winthrop | 351/169 |
| 4,208,362 | 6/1980 | Deichert et al. | 264/1 |
| 4,253,747 | 3/1981 | Maitenaz | 351/169 |
| 4,461,550 | 7/1984 | Legendre | 351/169 |
| 4,701,288 | 10/1987 | Cook et al. | 264/1.4 |
| 4,806,010 | 2/1989 | Ewer | 351/169 |
| 4,869,588 | 9/1989 | Frieder et al. | 351/168 |
| 4,873,029 | 10/1989 | Blum | 264/1.3 |
| 4,883,548 | 11/1989 | Onoki | 156/99 |
| 4,919,850 | 4/1990 | Blum et al. | 264/1.4 |
| 4,944,584 | 7/1990 | Maeda et al. | 351/172 |
| 4,952,048 | 8/1990 | Frieder et al. | 351/177 |
| 5,042,936 | 8/1991 | Guilino et al. | 351/169 |
| 5,080,472 | 1/1992 | Gupta | 359/652 |
| 5,147,585 | 9/1992 | Blum | 264/1.4 |
| 5,148,205 | 9/1992 | Guilino et al. | 351/159 |
| 5,178,800 | 1/1993 | Blum | 264/1.4 |
| 5,223,862 | 6/1993 | Dasher et al. | 351/163 |
| 5,258,144 | 11/1993 | Yean et al. | 264/1.7 |
| 5,305,028 | 4/1994 | Okano | 351/169 |
| 5,488,442 | 1/1996 | Harsigny et al. | 351/169 |
| 5,512,371 | 4/1996 | Gupta et al. | 428/412 |

FOREIGN PATENT DOCUMENTS

| | | |
|---|---|---|
| 1163002 | 9/1969 | United Kingdom . |
| WO82/03129 | 9/1982 | WIPO . |

*Primary Examiner*—Scott J. Sugarman

[57] ABSTRACT

An optical product such as an optical lens, or semi-finished lens blank is provided comprising a composite of at least three different and separately applied layers, each layer having a different refractive index which allow for a progressive multifocal lens having a wide and natural progression of vision when looking from far to near. In addition, a method is provided for simply, quickly and inexpensively manufacturing a composite refractive gradient progressive multifocal lens. A transition zone disposed between a base and an outer layer includes a distinct and separately applied transition layer or layers having an effective refractive index which is intermediate between the refractive indices of the base and outer layers, and preferably approximates the geometric mean of the refractive indices of the base and outer layers. This transition zone may include multiple transition layers, with each transition layer having a different and distinct refractive index. The lens is substantially free of unwanted peripheral astigmatism, incorporates a wide reading zone and is easy to fit a patient and possesses a cosmetic appearance which is mostly invisible.

28 Claims, 3 Drawing Sheets

REFRACTIVE INDEX GRADIENT LENS

FIELD OF INVENTION

The present invention relates to optical products such as optical lenses and semi-finished lens blanks having a continuous progression of power from the distance focus to the near focus, and more particularly to refractive gradient progressive multifocal lenses having a reduced amount of unwanted peripheral astigmatism, and refractive gradient bifocal lenses without a wide blurred blended area defining the add zone.

BACKGROUND OF THE INVENTION

Commercial multifocal lenses come in a variety of materials and are generally made of plastic or glass. These lenses come in many styles, sizes, and can be of a lined, blended or progressive design. Of these designs, lined bifocals have long been used by those requiring near vision correction. The lined bifocal segment is fused in the case of glass, or molded in the case of plastic. In either case, the bifocal segment line is noticeable and represents the junction of near and distance optical portions in the lens or a semi finished blank providing the distance focus and near focus. Bugbee (U.S. Pat. No. 1,509,636), Meyrowitz (U.S. Pat. No. 1,445,227), and Culver (U.S. Pat. No. 2,053,551) teach fused lined bifocals or multifocals. While lined bifocals have been used successfully for many years, they have several drawbacks. First, they are extremely noticeable and thus are not cosmetically appealing; second, the segment line creates a blur when looking from far to near objects and vice versa; and third, there is an abrupt change of focal length when looking from far to near objects and back again. No optical area is provided with intermediate power (focal length) at all, unless a lined trifocal is used.

Blended bifocals, such as those disclosed in WO82/03129, are bifocals which retain a clear demarcation between the optical zones with far focus and near focus; however, the line of demarcation is blended to make it far less noticeable. Blended bifocals attempt to solve the cosmetic disadvantage of a lined bifocal, but in doing so create a wide blended blur zone when looking from far to near objects and back again, as well as failing to provide intermediate vision.

Progressive addition lenses are a type of multifocal lens which incorporate a progression of power changes from far to near correction, creating a progressive vision transition from far to near power and back again. Progressive addition lenses represent an attempt to solve the problems discussed above. Although progressives solve several deficiencies of lined or blended bifocal lenses, they require other compromises in optical design, which in turn compromise the visual function of the lens optic, as discussed below. Progressive addition lenses are invisible, and provide a natural transition of power from far to near foci.

Methods of making progressive addition lenses are disclosed, for example, by Harsigny (U.S. Pat. No. 5,488,442), Maitenaz (U.S. Pat. No. 4,253,747), Maitenaz (U.S. Pat. No. 3,687,528), Cretin et al. (U.S. Pat. No. 3,785,725), Maitenaz (U.S. Pat. No. 3,910,691), Winthrop (U.S. Pat. No. 4,055,379), Winthrop (U.S. Pat. No. 4,056,311), and Winthrop (U.S. Pat. No. 4,062,629). These lenses, however have certain deficiencies which are inherent in their design. A first deficiency is that only a relatively narrow reading channel width of about 3–8 mm, defined as the space between two meridional imaginary lines characterized by astigmatism of +/−0.50 diopters or more. This reading channel represents the progressive transition of focal lengths from far to near, enabling one to see from far to near in a somewhat natural manner without experiencing the abrupt change of power of a lined bifocal. A second deficiency is that progressive addition lenses can only provide a relatively narrow reading zone which is about 22 mm wide or less. A third major deficiency is the unwanted peripheral astigmatism which is created due to the nature of the progressive optical design. This unwanted peripheral astigmatism creates significant visual distortions for the user. Manufacturers are interested in limiting the amount of unwanted astigmatism in order to enhance the visual performance, and thus increase the acceptance levels of their different designs. In practice, all progressive lens designs represent compromises among having a lens with the widest possible channel, the lowest amount of unwanted astigmatism and the widest add power zone. A fourth major deficiency is the difficulty of properly fitting the patient with a progressive; and, the fifth deficiency is the low tolerance for fitting error allowed by these designs.

Numerous attempts have been made to solve the inherent problems discussed above with lined, blended, trifocals, and progressive multifocals. However, no other commercially viable options have been found. The ophthalmic lens design disclosed in Frieder (U.S. Pat. No. 4,952,048) and Frieder (U.S. Pat. No. 4,869,588) addresses some of these deficiencies, but fails to provide a satisfactory solution due to both manufacturing difficulties and poor cosmetic appearance at moderate to higher add powers. Although these patents disclose a lens with several improved features, in the moderate to higher add powers from +1.75 to +3.00 diopters, this lens caused the front (convex) surface defining the periphery of the near power zone to bulge anteriorly and thus cause a visible optical distortion on either side of the reading zone. This feature significantly reduced its commercial appeal. Furthermore, difficulties in manufacturing this lens made the lens less commercially viable.

Maeda (U.S. Pat. No. 4,944,584) discloses a refractive gradient lens using a first partially cured substrate layer. A second uncured resin layer is added and diffusion occurs between these two layers during curing to create a third diffusion layer having a refractive index gradient which varies continuously between the refractive indices of the first and second layers. To achieve this diffusion layer, the assembly containing the second layer is heated at specified temperatures for 20–26 hours. The time required for curing to form the diffusion layer makes this procedure unattractive from a commercial standpoint. Furthermore, it is known that the process disclosed in Maeda, which includes demolding a partially cured lens or semi-finished blank, can create yield problems. Thus, while it may be theoretically possible to achieve Maeda's third, continuously varying, refractive index gradient diffusion layer, actual manufacturing difficulties may reduce the likelihood that the Maeda lens could achieve commercial success.

In addition to the deficiencies previously mentioned concerning bifocal and multifocal lenses, these lens styles are also thicker than single vision lenses of equivalent distance power, since they are required to provide for additional plus power in the add power zone. This added thickness on the anterior surface of the lens tends to detract from their cosmetic appeal and adds additional weight to the lens. Several solutions to this problem have been proposed.

Blum (U.S. Pat. No. 4,873,029) describes the use of a preformed wafer having desired multifocal segments formed thereon and adding a resin layer of a different index of refraction onto the surface of the preformed wafer. In this approach, the preformed wafer is consumed during the molding process so that the preformed wafer ultimately forms part of the lens. While this approach produces a cosmetically improved lens, the process requires hundreds of gaskets and back convex spherical and toric molds. These molds ultimately make the concave side of the finished lens. Furthermore, with this approach the bifocal or multifocal zone is not invisible due to the significant refractive mismatch needed and the lack of a transition of refractive indices of various materials.

Various patents disclose refractive gradient bifocal, multifocal or progressive lens styles, e.g., Dasher (U.S. Pat. No. 5,223,862), Maeda (U.S. Pat. No. 4,944,584), Yean (U.S. Pat. No. 5,258,144), Naujokas (U.S. Pat. No. 3,485,556), Okano (U.S. Pat. No. 5,305,028), Young (U.S. Pat. No. 3,878,866), Hensler (U.S. Pat. No. 3,542,535), and Blum (U.S. Pat. No. 4,919,850). However, the commercial production of refractive gradient multifocal ophthalmic lenses to date has not been commercially successful due to chemistry, technology, manufacturing and cost limitations.

In European Patent Application No. PCT/US93/02470, Soane discloses producing a multifocal lens having a bifocal and astigmatic area on the back, concave side of the front optical wafer preform. Soane discloses curing a resin material having a different index of refraction from the optical wafer preform onto the back of the front optical wafer preform using an appropriate back convex mold having the correct curvature. This approach, however, requires that a significant number of front optical preforms be inventoried.

In view of the above, it is desirable to have a progressive multifocal lens which would allow the end user a wide and natural progression of vision when looking from far to near, being substantially free of or having a reduced amount of unwanted peripheral astigmatism, having a wide reading zone, requiring a smaller inventory of skus (stock keeping units) and being relatively forgiving and easy to fit for the patient. In addition, it would be desirable to have a progressive multifocal lens which has substantially the same thickness as a single vision lens of equivalent distance prescription, and which cosmetically is almost invisible in appearance. Also, it is desirable to manufacture such optical products in a way that reduces the amount of processing time.

SUMMARY OF INVENTION

The present invention solves these and other inconveniences of the prior art by providing an optical product such as a composite refractive gradient progressive multifocal preform, lens or semi-finished lens blank and method of manufacture which provides for simply, quickly and inexpensively manufacturing a composite refractive gradient progressive multifocal optical preform, lens, or semi-finished lens blank. The optical product, such as a lens, comprises a composite of at least three different layers, including a base layer having a region of varying thickness which can be either depressed or raised, a transition zone and an outer layer. Each of the layers of the composite are separately applied and are bonded to an adjacent layer or layers. In addition, each layer has a different and distinct refractive index which allows for a progressive multifocal lens having a wide and natural progression of vision when looking from far to near. Interposed between a base layer and an outer layer is a transition zone comprised of at least one transition layer. The transition zone has an effective refractive index which is intermediate between the refractive indices of the base and outer layers. Preferably, the effective refractive index is approximately the geometric mean of the refracive indices of the base and outer layers. In addition, the lens of the present invention is substantially free of or has a reduced amount of unwanted peripheral astigmatism, incorporates a wide reading zone and is relatively forgiving and easy to fit for the patient, and possesses a cosmetic appearance which is substantially invisible.

In addition, the present invention drastically reduces the number of front optical preforms that must be inventoried. For example, assuming add powers of +1.00 to +3.00 diopters, sphere powers of +4.0 to −4.0 diopters, cylinder powers of plano to −2.0 diopters, 3 base curves of the lenses, right and left eyes; and assuming the astigmatic power is added as is disclosed by Soane (PCT/US93/02470) on the concave side of the front optical preform, then for each type of material it would be necessary to inventory the following skus:

1. for bifocal lenses - 9,720 different front optical preforms for astigmatic bifocal correction are required, based on 180 different astigmatic degrees×3 base curves×2 eye decentrations×9 bifocal add powers×1 material; and 2. for single vision lenses - 540 different front optical preforms for astigmatic correction only are required, based on 180 different astigmatic degrees×3 base curves×1 material.

Thus, in the above example Soane would require a total of 10,260 front optical preforms are required, in addition to back-up inventories that may be required for each sku. In contrast, the present invention requires only 540 skus and only 3 pairs of molds based on 180 different astigmatic degrees×3 base curves×1 material. Furthermore, Soane would require that numerous gaskets and molds to be used and would not produce a bifocal or multifocal zone as cosmetically invisible as the present invention because of the significant refractive index mismatch needed and the lack of a transition layer or layers of different refractive index.

DETAILED DESCRIPTION

Figure 1:
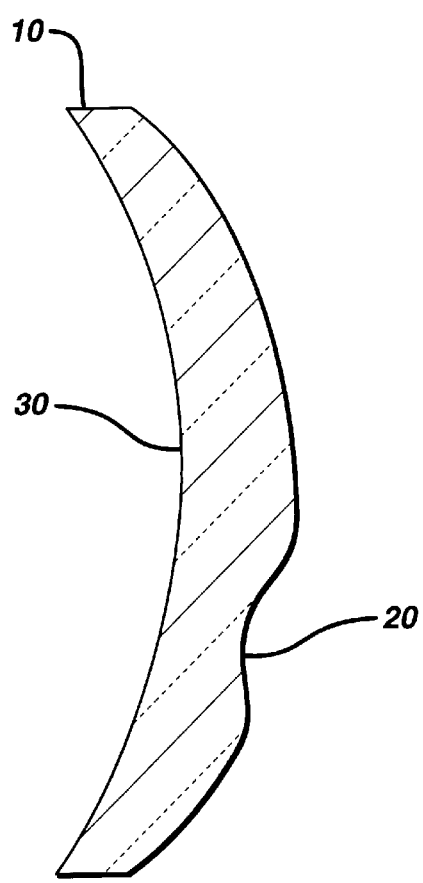
FIG. 1 is a cross section view of an optical preform according to the present invention.

FIG. 1 illustrates a base layer which is an optical preform 10 containing both spherical and astigmatic prescriptions being made of a material having a refractive index of 1.49 and having a spherical convex surface with a modified region 20 which has been modified by mechanical means to form a surface depression which approximately defines the boundaries of the progressive multifocal zone. The modified region 20 could be made on either the convex or concave surface. However, in this embodiment the modification is performed on the convex surface. The astigmatic curves or toric surface 30 is located on the concave side. For this reason the appropriate toric optical preform is selected and rotated to the appropriate astigmatic axis for the particular prescription needed and the optical modification is performed on the front convex surface in the correct orientation relative to the desired astigmatic axis. Not only does the modified region 20 take into account the astigmatic axis needed but also at the appropriate and different decentration location for each of the right and left eyes.

Although, for purposes of illustration, mechanical modification of the surface is disclosed, it should be understood that any method which would create the needed alteration to the surface geometry would work. For example, by way of illustration only, the surface depression can be accomplished by a variety of methods which include stamping, burning, sculpturing, grinding, ablating, and casting. The method of obtaining the surface depression is somewhat dependent on the cure condition of the preform, as well as the composition of the preform material. For example, in order to grind the preform, the preform should generally be in a fully cured or hardened condition.

The modified region 20 is formed on the optical preform 10 to create a surface depression which will generally define the boundaries of the progressive multifocal zone. The desired geometry of the depression can be calculated using known optical formulas pertaining to refractive index. In general, $nd = n_1 d_1 + n_2 d_2$, where n is the overall refractive index of the optic, d is the thickness of the optic, $n_1$ is the refractive index of the optical preform, $d_1$ is the thickness of the optical preform, $n_2$ is the refractive index of the added layer and $d_2$ is the thickness of the added layer. The power at any point is determined by the overall or effective refractive index at that point, which in turn is controlled by the depth of the cavity or depression at that point from the surface contour (sag depth), and the refractive index of the cured resin filling the cavity.

Figure 2:
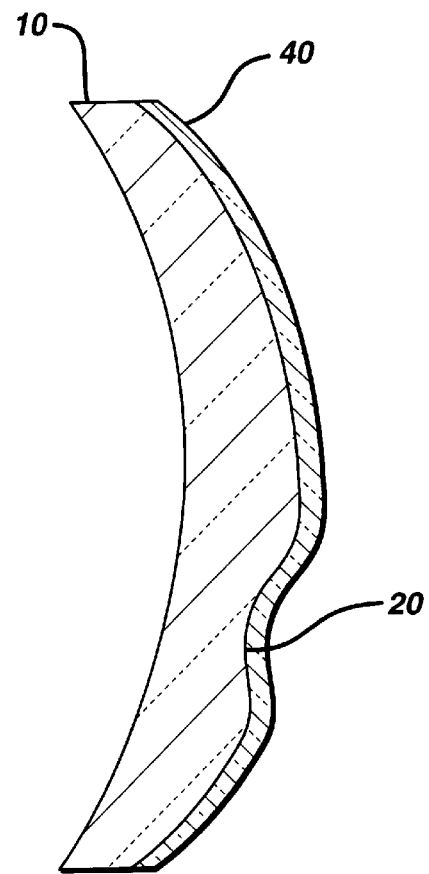
FIG. 2 is a cross section view of an optical preform having a transition layer.
Figure 4:
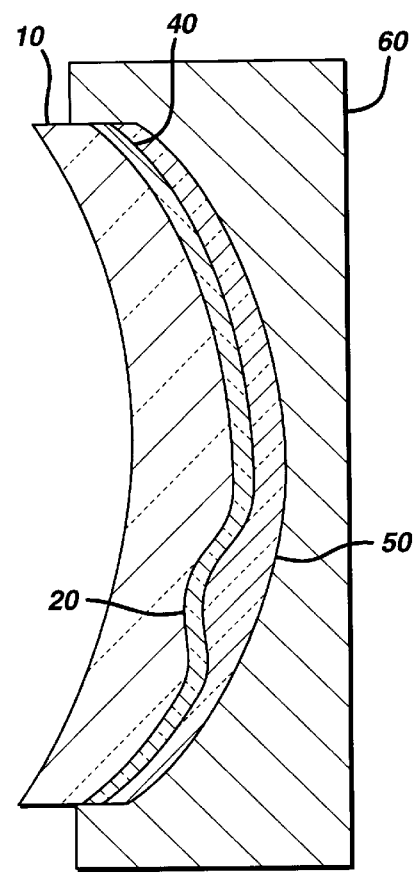
FIG. 4 is a cross section view of a mold positioned against an outer layer.

Depending upon the modification method used as well as the material of the optical preform, once the modification is performed and the desired surface topography is achieved, the newly altered surface may be further modified by polishing, surface casting, or other methods known in the art to smooth over a roughened surface. In a preferred embodiment, the mechanically altered surface is mechanically abraded to achieve a rough surface. As shown in FIGS. 2 and 4, a thin layer of resin is then applied to the entire convex surface of the optical preform 10 including the modified region 20 to form a transition layer 40 which comprises a transition zone 45. In an alternate embodiment, the transition layer can be applied to only a portion of the preform 10 which includes at least the modified region 20.

Suitable materials for the optical preform may generally include copolymers of allylics, acrylates, methacrylates, styrenics and viylics, such that the glass transition temperature is between approximately 50° C. and 200° C. and the refractive index is between approximately 1.44 and 1.56. For example, such materials may include poly(diethyl bis allyl carbonate), poly-(bisphenol A carbonate) and poly (styrene)-co-(bisphenol A carbonate diacrylate)-co-(bisphenol A carbonate dimethacrylate).

Materials for the transition zone may generally include copolymers of allylics, acrylates, methacrylates, styrenics and viylics, such that the glass transition temperature is between approximately 50° C. and 100° C. and the refractive index is between approximately 1.52 and 1.65. For example, such materials may include poly(poly oxy methylene diacrylate)-co-(ethoxylated bis phenol A carbonate diacrylate)-co-(furfuryl acrylate).

The refractive index of the transition layer 40 is purposely formulated to be mismatched to the refractive indices of the preform 10 and a subsequently applied outer layer 50, in order to achieve a transition midpoint of the refractive gradient being achieved. This technique is used in order to render the progressive multifocal area as invisible as possible. In addition, when the transition layer 40 is applied to the preform 10, it can prepare the surface of the preform 10 for good bonding with the next resin layer to be applied and can significantly smooth out surface irregularities which might remain and be visible once another resin layer is applied.

Figure 6:
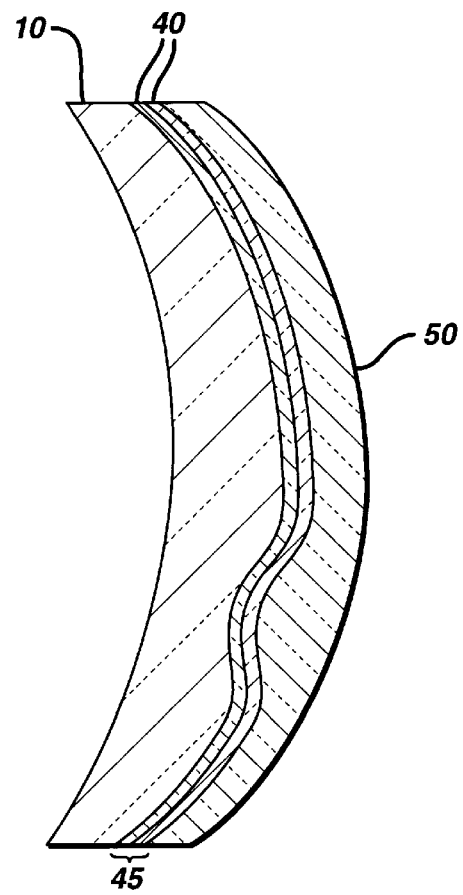
FIG. 6 is a cross section view of an alternate embodiment of the present invention.

Although the refractive index of the transition layer 40 is formulated to achieve minimum internal reflection from the interface, other embodiments using different surface modification techniques, or optical preforms made of different materials may be used, or the refractive index of the coating may be formulated to be closer to that of the optical preform or to that of the next resin layer to be applied, or may not even be needed. As shown in FIG. 6, an alternative embodiment of the present invention may have at least one additional transition layer 40, with the transition layers being placed on top of each other after partially or fully curing each layer. Each transition layer 40 has a different refractive index such that the layers collectively form a transition zone 45 which has an effective refractive index that is approximately the geometric mean of the optical preform 10 and the outer layer 50. Having a transition zone with an effective refractive index approximating the geometric mean makes the transition of refractive indices less abrupt and thus make the finished multifocal zone more invisible. Although the effective refractive index should approximate the geometric mean, a variation of +/−0.03 units produces acceptable results.

Suitable materials for the outer layer 50 may generally include copolymers of allylics, acrylates, methacrylates, styrenics and viylics, such that the glass transition temperature is between approximately 60° C. and 225° C. and the refractive index is between approximately 1.56 and 1.70. For example, such materials may include ethoxylated bisphenol A diacrylate, ethoxylated bisphenol A dimethacrylate, ethoxylated 1,4-dibromo-bisphenol A diacrylate, bis(4-acryloxyethoxyphenyl)phosphine oxide, 1,4-divinylbenzene, bromostyrene, and vinylcarbazole.

In other embodiments of the present invention, an additional resin layer or layers may be interposed between the base layer and the transition zone. Also, additional resin layers can be interposed between transition layers in the transition zone or between the transition zone and the outer layer or layers. This additional layer or layers should have a surface energy that sufficiently matches adjacent layers so that the resin can provide the desired degee of coating of the underlying layer.

Although in the preferred embodiment the transition layer 40 is applied by brushing, the layer may also be applied by other techniques readily known in the art. For example, such techniques as spin coating, dip coating, spray coating or others may be used.

Once the transition layer 40 is applied to the convex surface of the optical preform 10, the transition layer 40 is preferably partially cured. The curing process may be performed with any known curing method including a thermal cure, UV cure, visible light cure, or combination thereof, in the absence or presence of oxygen using the appropriate initiators, atmospheric environment, and curing source. In the preferred embodiment, the transition layer 40 is partially cured in an oxygen free nitrogen environment using ultraviolet light within the range of approximately 250–400 nm. However, use of visible light within the range of about 400–450 nm in an oxygen free nitrogen environment also may be used. When a UV source is used for curing, the optical product can be rapidly manufactured since the curing time for a transition layer can be less than five minutes and generally will not exceed an hour.

Figure 3:
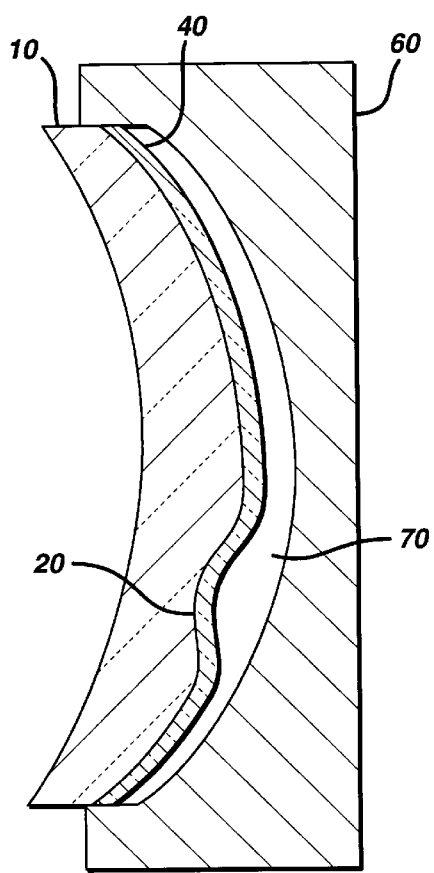
FIG. 3 is a cross section view of an optical preform positioned against a mold.

As shown in FIGS. 3 and 4, once the modified region 20 is formed in the optical preform 10 to achieve the desired surface topography and the desired transition zone 45 is applied, the optical preform with the transition zone 45 is ready to be provided with an outer layer 50 which is preferably formed by casting resin onto the transition zone 45. The outer layer 50 is formulated to have a refractive index significantly different from the optical preform 10 material. In the preferred embodiment, the resin of the outer convex layer 50 is formulated to have a refractive index of about 1.66; the optical preform 10 material has a refractive index of about 1.49; and the refractive index of the transition layer 40 is a constant of about 1.57. Thus, the 1.66 refractive index convex outer layer 50 is cast from a resin onto the 1.574 refractive index convex transition layer 40 which is affixed to the 1.49 refractive index optical preform 10. This is preferably done in this example using a single vision spherical mold 60 which is selected to cast the desired outer convex curvature onto the optical preform 10 having the transition layer 40. If the convex curvature of the optical preform 10 is aspheric in design, the appropriate single vision mold selected for SurfaceCasting the outer convex surface will be an aspheric design rather than spherical design. This outer curvature will control the desired distance power achieved. Appropriate techniques for providing the cast layer are described in Blum (U.S. Pat. No. 5,178,800) ("'800"), Blum (U.S. Pat. No. 5,147,585) ("'585"), Blum (U.S. Pat. No. 5,219,497) ("'497"), and Blum (U.S. Pat. No. 4,873,029) ("'029"), however, using a single vision mold. The contents of these patents are incorporated herein by reference. These techniques are also commercially available from Innotech, Inc. by way of its Excalibur® SurfaceCasting® system.

The mold 60 used to cast the outer layer 50 can be made out of any applicable material allowing for proper cure. By way of example only, electroformed nickel, glass, and plastic disposable molds can be used. Prior to the curing process, the resin used to cast the outer layer 50 can be dispensed into the mold 60, dispensed into a cavity 70 between the mold 60 and the preform 10, or provided in the form of a partially cured polymeric layer included with the mold 60 or attached to the optical preform 10. In embodiments where the outer layer 50 is produced from a partially cured polymeric layer which is later cured, the transition layer 40 or layers which produce the refractive index transition zone 45 can be attached to the partially cured polymeric outer layer 50. In this case, the partially cured polymeric layer and attached refractive index transition layer 40 are then cured and formed onto the optical preform 10. Although the preferred embodiment does not use a gasket while casting the outer convex curvature onto the optical preform, in certain embodiments a gasket may be used.

When the transition zone includes a plurality of layers, the refractive index of each layer is selected so that the transition zone has an effective refractive index that is approximately the geometric mean of the preform and the outer layer. By way of example only, if the preform has a refractive index of about 1.50 and the outer layer has a refractive index of about 1.70, the refractive indices of three transition layers in a transition zone may be about 1.54, 1.60 and 1.66 as the layers progress from the preform to the outer layer.

The transition zone 45 is comprised of a distinct and separately applied layer or layers, wherein each layer has a different refractive index and is formulated so that the transition zone 45 has an effective refractive index which is intermediate and approximates the geometric mean of the refractive indices of the optical preform 10 and the outer layer 50. The refractive index of each transition layer in the transition zone is generally constant throughout the entire layer.

During the cure step, the partially cured transition layer 40 as well as the SurfaceCast resin outer layer 50 become cured to the desired degree to form a refractive index gradient progressive multifocal optical lens, or semi-finished blank. In the case of the preferred embodiments, the refractive index gradient varies from about 1.40 to 1.66, with different thicknesses of each material being defined by the geometries of the convex surface topography of the modified optical preform, the concave spherical and astigmatic surface topography of the optical preform and the single vision spherical concave mold surface which adds the desired outer convex curve onto the convex side of the modified and customized optical preform to achieve the desired power. Innotech's SurfaceCasting commercial product typically applies a surface layer in a manner so that the distant power of the desired prescription is not substantially changed. However, in the present invention the outer layer may or may not be confined to leaving the distant power substantially unchanged. Furthermore, unlike Innotech's commercial SurfaceCasting technology and the technology of the '800, '585, '029 and '497 patents, the progressive addition multifocal region of the present invention is not added by way of a multifocal mold but rather is created due to the altered surface topography of the optical preform 10 as well as the refractive index gradient which results from casting a spherical or aspheric surface onto an altered surface topography which is specifically altered to cause different varying thickness of a refractive gradient.

Figure 5:
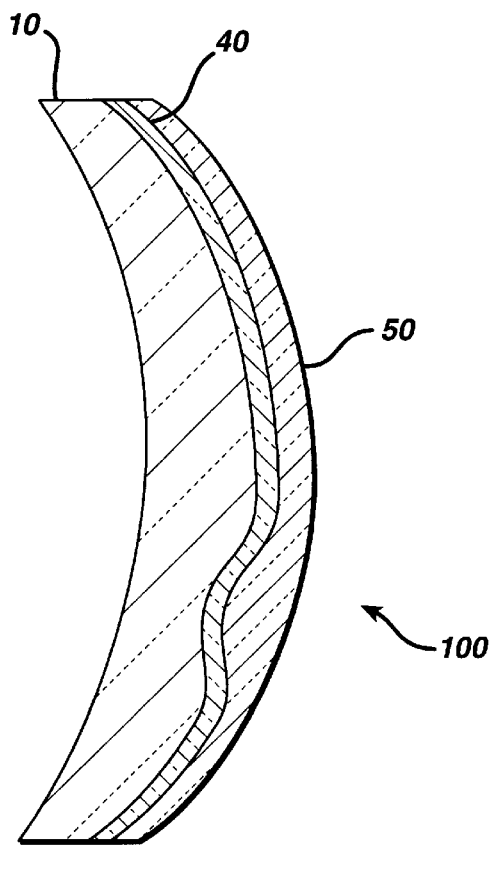
FIG. 5 is a cross section view of an optical product according to the present invention.

Referring to FIG. 5, once the casting process is completed, the composite refractive gradient progressive multifocal lens 100 is removed from the mold 60. The newly formed composite lens 100 can be post cured in the mold or outside of the mold by techniques which are well known in the art.

The method of the present invention can be used to make optical preformed optical lenses, and optical semi-finished blanks. Resins used to form any and all layers can be photochromatic if desired, so long as the proper refractive index is achieved for the particular layer. In addition, although the preferred embodiment has been illustrated by using resins to form the layers, it is understood that the layers of the composite can also be made from a glass or a combination of resin and glass.

The outer layer of the newly formed composite lens 100 can be surface treated in any manner used in the optical industry, including applications of anti-reflective coatings, scratch resistant coatings, tints, photochromatic coatings and or photochromatic impregnation techniques, soil resistant coatings, etc. Furthermore, in-mold transfer of various coatings can also be utilized as part of the fabrication process as opposed to being applied after the lens or semi-finished blank is fabricated.

The present invention provides bifocal add powers and the desired decentration for the right and left eyes, and establishes the correct optical toric axis. These results are preferably accomplished by modification of the convex surface of the optical preform. In other embodiments of the invention, the modification to the geometry of the optical preforms can be made by modifying the concave side of the optical preform in the same or similar manner as the modification is done to the convex surface. In this case, the optical preform surface modification and casting are performed on the concave side of the optical preform as opposed to the front side of the optical preform.

Also, in certain other embodiments, the surface topography modification of the optical preform can be made with a certain depth and geometry and aligned opposite a bifocal or multifocal zone of a mold containing the appropriate surface curvature needed. This is done to add not only the appropriate outer curvature, but also to add additional confining geometry in the region of the bifocal or multifocal zone of the finished lens. By using this approach, it is possible to use materials having a smaller index of refraction differential than the materials used in the preferred embodiment.

What is claimed is:

1. An optical product, comprising:
   a base layer having a first refractive index and a region of varying thickness;
   an outer layer having a second refractive index different from the first refractive index; and
   a transition zone comprising at least one layer bonded between the base and outer layer, each of the layers having a different refractive index and which differs from the refractive indices of the base layer and the outer layer wherein the refractive index of each of said at least one layer is substantially constant throughout the layer and the transition zone has an effective refractive index which is approximately the geometric mean of the refractive indices of the base and outer layer.

2. The optical product of claim 1, wherein a surface depression is on a convex surface of the base layer and approximately defines a progressive multifocal zone.

3. The optical product of claim 2, wherein the second refractive index of the outer layer is greater than the first refractive index of the base layer.

4. The optical product of claim 3, wherein the first refractive index of the base layer is approximately 1.44 to 1.56.

5. The optical product of claim 4, wherein the second refractive index of the outer layer is approximately 1.56 to 1.70.

6. The optical product of claim 5, wherein the first refractive index of the base layer is approximately 1.49.

7. The optical product of claim 6, wherein the second refractive index of the outer layer is approximately 1.66.

8. The optical product of claim 1, wherein a raised region is on a convex surface of the base layer and approximately defines a progressive multifocal zone.

9. A composite ophthalmic lens, comprising:
   an optical preform having first refractive index and a region of varying thickness;
   an outer layer having a second refractive index different from the refractive index of the optical preform; and
   a transition zone comprising at least one layer bonded between the optical preform and outer layer covering at least the region of varying thickness, wherein each of the at least one layer has a different refractive index and which differs from the refractive indices of the optical preform and the outer layer, the refractive index of each of the at least one layer being substantially constant throughout the layer and the transition zone having an effective refractive index approximately the geometric mean of the refractive indices of the optical preform and the outer layer.

10. The ophthalmic lens of claim 9, wherein a surface depression is on a convex surface of the optical preform and approximately defines a progressive multifocal zone.

11. The ophthalmic lens of claim 10, wherein the second refractive index of the outer layer is greater than the first refractive index of the optical preform.

12. The ophthalmic lens of claim 11, wherein the first refractive index of the optical preform is approximately 1.44 to 1.56.

13. The ophthalmic lens of claim 12, wherein the second refractive index of the outer layer is approximately 1.56 to 1.70.

14. The ophthalmic lens of claim 13, wherein the first refractive index of the optical preform is approximately 1.49.

15. The ophthalmic lens of claim 14, wherein the second refractive index of the outer layer is approximately 1.66.

16. The ophthalmic lens of claim 9, wherein a raised region is on a convex surface of the optical preform and approximately defines a progressive multifocal zone.

17. A method of manufacturing a composite optical product, comprising the steps of
   a.) providing a base layer having a first refractive index and a surface depression;
   b.) applying a transition zone comprising at least one resin layer to at least the surface depression of the base layer, the transition zone having an effective refractive index that is approximately the geometric mean of the refractive indices of the base layer and the outer layer, wherein each of said at least one layer having a different refractive index which is substantially constant throughout the layer and which differs from the refractive indices of the base layer and outer layer, and each of the at least one layer is at least partially cured before application of a subsequent layer;
   c.) applying an outer layer of resin to at least the transition zone, the outer layer having a second refractive index different from the refractive index of the base layer; and
   d.) curing the transition zone and the outer layer to produce a finished optical product.

18. The method of claim 17 further comprising the step of molding the outer layer to a desired curvature.

19. The method of claim 18, wherein the outer layer is a partially cured polymeric layer.

20. The method of claim 17, further comprising the step of partially curing the transition zone before applying the outer layer.

21. The method of claim 18, wherein the transition zone is partially cured using light having a wavelength of approximately 250–450 nm.

22. The method of claim 21, wherein the transition zone is partially cured using visible light having a wavelength of approximately 400–450 nm.

23. The method of claim 17, wherein the outer layer is applied to the transition layer by surface casting.

24. The method of claim 17, further comprising the step of applying at least one resin layer between the base layer and the outer layer.

25. The method of claim 17, wherein said transition layer is provided by brushing, spin coating, dip coating, or spray coating.

26. A composite ophthalmic lens, comprising:
   an optical preform having a refractive index of approximately 1.49 and a surface depression on a convex surface of the optical preform, the surface depression approximately defining a progressive multifocal zone, said optical preform having a spherical power or an astigmatic power of both;

an outer plastic layer having a refractive index of approximately 1.66; and a transition zone comprising at least one layer bonded between the optical preform and outer layer covering at least the surface depression, wherein each of the at least one layer has a different refractive index which differs from the refractive indices of the optical preform and the outer layer, said refractive index of each of the at least one layer being substantially constant throughout the layer, and the transition zone having an effective refractive index which is approximately the geometric mean of the refractive indices of the optical preform and the outer layer.

27. A method of manufacturing a composite optical product, comprising the steps of:

a.) providing a base layer having a first refractive index and a surface having a raised region;

b.) applying a transition zone comprising at least one layer of resin to at least the raised region of the base layer, the transition zone having an effective refractive index which is the geometric mean of the refractive indices of the base layer and an outer layer, wherein the each of said at least one layer comprising resin and having a different refractive index which is substantially constant throughout the layer and which differs from the refractive indices of the base layer and an outer layer, and each of the at least one layer is at least partially cured before application of a subsequent layer;

c.) applying an outer layer of resin to at least the transition zone the outer layer having a second refractive index different from the refractive index of the base layer and the effective refractive index of the transition zone; and d.) curing the transition zone and outer layer to produce a finished optical product.

28. A composite ophthalmic lens, comprising:

an optical preform having a refractive index of approximately 1.49 and a raised region on a convex surface of the optical preform, the raised region approximately defining a progressive multifocal zone, said optical preform having a spherical power or an astigmatic power of both;

an outer plastic layer having a refractive index of approximately 1.66; and a transition zone comprising at least one layer bonded between the optical preform and outer layer covering at least the surface depression, wherein each of the at least one layer has a different refractive index and which differs from the refractive indices of the optical preform and the outer layer, said refractive index of each of the at least one layer being substantially constant throughout the layer, and the transition zone having an effective refractive index which is approximately the geometric mean of the refractive indices of the optical preform and the outer layer.

\* \* \* \* \*